United States Patent [19]
Lucki et al.

[11] B 3,914,331
[45] Oct. 21, 1975

[54] DISPROPORTIONATION OF ALIPHATIC COMPOUNDS

[75] Inventors: Stanley J. Lucki, Runnemede; Nai Yuen Chen, R.D. Titusville, both of N.J.; Emerson Bowes, Erie, Pa.

[73] Assignee: Mobil Oil Corporation, New York, N.Y.

[22] Filed: Apr. 11, 1973

[21] Appl. No.: 350,245

[44] Published under the Trial Voluntary Protest Program on January 28, 1975 as document no. B 350,245.

Related U.S. Application Data

[63] Continuation-in-part of Ser. No. 101,193, Dec. 23, 1970, abandoned, which is a continuation of Ser. No. 722,207, April 18, 1968, abandoned.

[52] U.S. Cl. ........ 260/676 R; 208/DIG. 2; 208/120; 260/683.65
[51] Int. Cl.$^2$ .......................................... C07C 3/62
[58] Field of Search ...................... 208/DIG. 2, 120; 260/676 R, 683.65

[56] References Cited
UNITED STATES PATENTS 3,140,253   7/1964    Plank et al. .................... 260/683.65
3,190,939   6/1965    Benesi ........................... 260/683.65
3,201,356   8/1965    Kress et al. .................... 260/683.65
3,236,762   2/1966    Rabo et al. ..................... 260/683.65
3,280,212   10/1966   Miale et al. .................... 260/683.65
3,299,153   1/1967    Adams et al. ................... 260/683.65
3,301,917   1/1967    Wise ............................. 260/683.65
3,370,099   2/1968    Plank et al. .................... 260/683.65
3,507,931   4/1970    Morris et al. ................... 260/683.65
3,578,723   5/1971    Bowes et al. ................... 260/672

Primary Examiner—Paul M. Coughlan, Jr.
Assistant Examiner—C. E. Spresser
Attorney, Agent, or Firm—Charles A. Huggett; Raymond W. Barclay; Dennis P. Santini

[57] ABSTRACT

A method for effecting disproportionation of an aliphatic charge which comprises contacting said aliphatic charge under conditions effective for disproportionation with a catalyst comprising a catalytically-active zeolite which can be represented, in terms of mole ratios of oxides in the anhydrous state, by the following formula:

$$0.9 \pm 0.2 \ M_{2/n}O : Al_2O_3 : 3\text{--}20 \ SiO_2$$

wherein M is a cation and $n$ is the valence of M, and products of thermal treatment of said zeolite.

9 Claims, No Drawings

DISPROPORTIONATION OF ALIPHATIC COMPOUNDS

CROSS-REFERENCE TO RELATED APPLICATIONS

This is a continuation-in-part of application Ser. No. 101,193, filed Dec. 23, 1970 which is a continuation of application Ser. No. 722,207, filed Apr. 18, 1968, both now abandoned.

BACKGROUND OF THE INVENTION

1. Field of the Invention

This invention relates to disproportionation of aliphatic compounds. More particularly, this invention relates to disproportionation of paraffin hydrocarbons employing catalytically active zeolite catalysts therefor.

2. Description of the Prior Art

Several catalysts have heretofore been employed for effecting isomerization or disproportionation of paraffins and other aliphatic compounds. These catalysts have generally been of the amorphous type, although some crystalline zeolitic type catalysts have been used to provide low quantities of isomers or disproportionation products of a paraffin charge.

U.S. Pat. No. 3,140,253 shows certain rare earth hydrogen crystalline aluminosilicates for cracking, isomerization, hydroisomerization and disproportionation. The aluminosilicates disclosed for use in said patent are zeolites A, Y, L, D, R, S, T, Z, E, F, Q, B, X, ZK-4, ZK-5 and others, not including the substantially different zeolite ZSM-4.

U.S. Pat. No. 3,280,212 teaches disproportionation of aromatic hydrocarbons in the presence of an activated crystalline aluminosilicate catalyst, not including zeolite ZSM-4.

Applicants have found that zeolite ZSM-4 provides vastly superior results in disproportionation of aliphatic compounds, such as, for example disproportionation of $C_5$ charge to $C_4$ and $C_6$ products, when compared to prior art crystalline alumino-silicates. Also, since ZSM-4 can be readily prepared from a mixture of inorganic oxides and/or organic oxides, it has become desirable to utilize a catalytically active form of it for disproportionation of aliphatic compounds, especially paraffins.

SUMMARY OF THE INVENTION

Broadly, this invention contemplates a method for effecting disproportionation of an aliphatic charge which comprises contacting said aliphatic charge maintained in a reaction zone under conditions effective for disproportionation with a catalyst comprising a catalytically active zeolite which generally can be represented, in terms of mole ratios of oxides in the anhydrous state, by the following formula:

$$0.9 \pm 0.2 \ M_{2/n}O : Al_2O_3 : 3\text{--}20 \ SiO_2$$

wherein M is a cation and $n$ is the valence of M, and products of thermal treatment of said zeolite.

DISCUSSION OF PREFERRED EMBODIMENTS

In a particularly desirable embodiment, this invention contemplates a method of disproportionating a paraffin charge which comprises contacting said paraffin charge maintained in a reaction zone at a temperature between 350° and 900°F with a catalytically active zeolite catalyst having the X-ray diffraction pattern of Table 1 below. Zeolites which have the characteristic X-ray diffraction pattern of Table 1 below include members of the family of zeolites known as ZSM-4.

In the as synthesized form, the zeolite has a formula, in terms of mole ratios of oxides in the anhydrous state, as follows:

$$0.9 \pm 0.2 \ M_{2/n}O : Al_2O_3 : 3\text{--}20 \ SiO_2$$

wherein m is a mixture of tetramethylammonium cations and alkali metal cations and $n$ has the previously assigned significance. The original cations can be present so that the amount of tetramethylammonium cations is between 1 and 50 percent of the total amount of the original cations. Thus, the zeolite can be expressed by the following formula, in terms of mole ratios of oxides in the anhydrous state:

$$0.9 \pm 0.2 \ [xR_2O + (1-x)M_{2/n}O] : Al_2O_3 : 3\text{--}20 \ SiO_2$$

wherein R is tetramethylammonium and M is an alkali metal cation.

The original cations can be replaced, at least in part, by ion exchange with another cation. Preferably, the other cation is selected from the group consisting of alkylammonium, e.g., tetramethylammonium, arylammonium, metals, ammonium, hydrogen, thermally treated products of ammonium and/or hydrogen, or combinations of any of these cations. Particularly, preferred cations include hydrogen, rare earth metals, aluminum, metals of Groups II and VIII of the Periodic Table and manganese. Also desired are zeolites which are thermally treated products of the ammonium, hydrogen, arylammonium and/or alkylammonium cationic form, said thermal treatment consisting of heating the zeolite in the particular cation form at a temperature of at least about 700°F.

Members of the family of ZSM-4 zeolites possess a definite distinguishing crystalline structure whose X-ray diffraction pattern has the following values:

Table 1

| Interplanar Spacing d(A) | Relative Intensity |
| --- | --- |
| 9.1 ± .2 | vs |
| 7.94 ± .1 | mw |
| 6.90 ± .1 | m |
| 5.97 ± .07 | s |
| 5.50 ± .05 | mw |
| 5.27 ± .05 | mw |
| 4.71 ± .05 | mw |
| 4.39 ± .05 | w |
| 3.96 ± .05 | w |
| 3.80 ± .05 | s |
| 3.71 ± .05 | m |
| 3.63 ± .05 | m |
| 3.52 ± .05 | s |
| 3.44 ± .05 | m |
| 3.16 ± .05 | s |
| 3.09 ± .05 | m |
| 3.04 ± .05 | m |
| 2.98 ± .05 | m |
| 2.92 ± .05 | s |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg-angle, were read from the spectrometer chart. From these, the relative intensities, 100 $I/I_o$, where $I_o$ is the intensity of the strongest line or peak, and d (obs.), the interplanar spacing in A., corresponding to the recorded lines, were calculated. In Table 1 the relative intensities are given in terms of the symbols s = strong, m = medium, mw = medium weak and vs = very strong. It should be understood that this X-ray diffraction pattern is characteristic of all the species of ZSM–4 compositions. Ion exchange of the sodium ion with another cation reveals substantially the same pattern with some minor shifts in interplanar spacing and variation in relative intensity.

Zeolite ZSM–4 can be suitably prepared by preparing a solution containing $R_2O$, sodium oxide, an oxide of aluminum an oxide of silicon, and water and having a composition, in terms of mole ratios of oxides, falling within the following ranges:

Table 2

|  | Broad | Preferred |
|---|---|---|
| $\frac{Na_2O}{R_2O + Na_2O}$ | .31 to 1 | .75 to .99 |
| $\frac{SiO_2}{SiO_2}$ | .05 to .90 | .15 to .75 |
| $\frac{Al_2O_3}{H_2O}$ | .3 to 60 | 6 to 30 |
| $R_2O + Na_2O$ | 15 to 600 | 20 to 150 | wherein R is a tetramethylammonium cation and maintaining the mixture until crystals of the zeolite are formed. Thereafter, the crystals are separated from the liquid and recovered. The composition can be prepared utilizing materials which supply the appropriate oxide. Such compositions include for an alumino-silicate, sodium aluminate, sodium silicate, silica hydrosol, silica gel, silicic acid, sodium hydroxide and tetramethylammonium hydroxide. It will be understood that each oxide component utilized in the reaction mixture for preparing a member of the ZSM–4 family can be supplied by one or more initial reactants. For example, sodium oxide can be supplied by an aqueous solution of sodium hydroxide, or by an aqueous solution of sodium silicate. The reaction mixture can be prepared either batchwise or continuously. Crystal size and crystallization time of the ZSM–4 composition will vary with the nature of the reaction mixture employed.

One method of preparing this new zeolitic material comprises forming an aqueous solution of the reactant mixture which solution is designated for convenience as a crystallization directing agent, or CDA, which contains sodium oxide, alumina, silica, and water. Use of this crystallization directing agent has been found to lead to better yields of ZSM–4 crystals and greater reproducibility. The CDA mixture or agent can have a composition, in terms of mole ratios of oxides, within the following ranges:

Table 3

|  | Broad | Preferred | Most Preferred |
|---|---|---|---|
| $\frac{Na_2O}{SiO_2}$ | | | |
| $\frac{SiO_2}{Al_2O_3}$ | 1 to 4 | 1.5 to 3 | 1.85 |
| $\frac{H_2O}{Na_2O}$ | 2 to 40 | 7 to 20 | 16 |
|  | 10 to 60 | 15 to 25 | 18 |

The crystallization directing agent mixture is aged for a period of time of about 0.2 to 4 hours, preferably 0.5 to 2 hours, at 40° to 70°C., preferably 60°C., and mixed into a second solution containing sodium oxide, silica, and water. A third solution containing alumina and water is added to the resultant solution with stirring thereby forming a slurry. The amounts of sodium oxide, silica, alumina and water in these later solutions are such that when added to the CDA, the amounts of the various ingredients fall within the broad range of Table 2. The slurry is heated for a short period of time at about 100°C., say, between about 0.5 and 1 hour, and the resultant product is filtered. The resulting filter cake comprises an amorphous material which is mixed in its wet state with solution, e.g., an aqueous solution, of tetramethylammonium hydroxide, preferably a somewhat dilute solution of about 5 to 25 percent concentration, weight basis. After thorough mixing, the last-described mixture, which is in the form of a slurry, is heated over a period of time to produce a crystalline product. It is generally heated at a temperature of about 100°C. for between about 1 and 3 days. The product is then filtered, washed until the washings show a pH below 11, and dried at 100°–110°C., for several hours.

When preparing the ZSM–4 catalyst, it is preferred to mix the various solutions employed in a mixing nozzle so as to effect maximum contact of the respective ingredients together. This contact in a mixing nozzle precedes heating of any resultant solution and crystallization of the aluminosilicate. This method is preferred whether or not a CDA is utilized and whether or not the tetramethylammonium compound is introduced directly into the solution or passed over the wet filter cake as discussed above. Less tetramethylammonium oxide is required to prepare ZSM–4 crystals by first preparing a wet filter cake than by the solution method normally utilized, provided sodium hydroxide is included in the tetramethylammonium ion solution to balance the electronegative charge of the aluminosilicate tetrahedra. However, as the ratio of tetramethylammonium ions to sodium ions in the solution passed over the filter cake increases the time of crystallization increases. Thus, if the time for crystallization of the ZSM–4 crystals is not critical, one can prepare ZSM–4 crystals employing a fraction of the amount of tetramethylammonium oxide employed in the solution method and compensating the electronegative charge of the aluminosilicate tetrahedra by increasing the sodium ion content in the solution passed over the wet filter cake proportionately.

Members of the ZSM–4 family can be base exchanged to remove the sodium cations by such ions as hydrogen (from acids), ammonium, and alkylammonium and arylammonium including $RNH_3$, $R_3NH+$, $R_2NH_2+$, and $R_4N+$ where R is alkyl or aryl, provided that steric hindrance does not prevent the cations from entering the cage, and cavity structure of the ZSM–4 alumino-silicate composition. The hydrogen form of ZSM–4, useful in such hydrocarbon conversion processes as isomerization of poly-substituted alkyl aromatics and disproportionation of alkyl aromatics, is prepared, for example, by base exchanging the sodium form with, say, ammonium chloride or hydroxide whereby the ammonium ion is substituted for the sodium ion. The composition is then calcined at a temperature of, say, 1000°F. causing evolution of ammonia and retention of a proton in the composition. Other replacing cations include cations of the metals of the Periodic Table, especially metals other than sodium, especially metals of Group II, e.g., zinc and Group VIII of the Periodic Table and rare earth metals and manganese.

The above crystalline zeolite, especially in its metal, hydrogen, ammonium, alkylammonium and arylammonium forms, can be beneficially converted to another form by thermal treatment. This thermal treatment is generally performed by heating one of these forms at a temperature of at least 700°F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1,600°F. at which temperature some decomposition begins to occur. The thermally treated product is particularly useful in the catalysis of certain hydrocarbon conversion reactions.

Regardless of the cations replacing the sodium in the synthesized form of the ZSM-4, the spatial arrangement of the aluminum, silicon and oxygen atoms which form the basic crystal lattice of ZSM-4, remains essentially unchanged by the described replacement of sodium or other alkali metal as determined by taking an X-ray powder diffraction pattern of the ion-exchanged material. Such X-ray diffraction pattern of the ion-exchanged ZSM-4 reveals a pattern substantially the same as that set forth in Table 1 above.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in as synthesized ZSM-4. This commercially available rare earth chloride solution contains chlorides of rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides, but having a lower cerium content. It consists of the following rare earths determined as oxides: lanthanum 45–65 percent by weight, cerium 1–2 percent by weight, praseodymium 9–10 percent by weight, neodymium 32–33 percent by weight, samarium 5–7 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations may be used.

Base exchange with various metallic and non-metallic cations can be carried out according to the procedures described in U.S. Pat. Nos. 3,140,251; 3,140,252 and 3,140,253.

The ZSM-4 aluminosilicates are formed in a wide variety of particular sizes. Generally speaking, the particles can be in the form of a powder, a granule, or a particle form such as an extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-4 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-4, i.e., combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally occurring clays which can be composited with the ZSM-4 catalyst include the montmorillonite and kaolin family, which families include the sub-bentonites, and the kaolins commoly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-4 and inorganic oxide gel matrix vary widely with the crystalline aluminosilicate content ranging from about 1 to about 90 percent by weight and more usually, particularly when the composite is prepared in the form of beads in the range of about 2 to about 50 percent by weight of the composite. ZSM-4 can be composited with Group II B and VI B metals and Group VIII transition metals and their oxides e.g., cobalt, molybdenum and tungsten.

Catalytically active members of the family of zeolites designated as ZSM–4 possess a property of selectivity which distinguishes them from other known zeolites. Selectivity is measured as the ratio of o-xylene isomerized to that disproportionated. The selectivity factor, as used herein, designates the weight ratio of o-xylene isomerized to o-xylene disproportionating employing 200 ml. of o-xylene which has been percolated with activated alumina at 2 volumes per volume per hour at room temperature and introduced into a 1 liter steel shaker bomb containing 3.0 grams of zeolite which has been calcined, weighed out and after being weighed, dried at 900°F. for one-half hour, said bomb having been purged with nitrogen. The bomb is heated to 400°F. rapidly using an induction furnace while shaking at 200 RPM using an electric driven single cylinder Lawson engine for shaking the bomb. After 20 percent of the o-xylene is converted to conversion products, the bomb is water quenched, the shaking discontinued and the liquid sample analyzed. A complete description of apparatus to be used in determining the selectivity factor is disclosed in the article "A New Laboratory Tool for Studying Thermal Processes", J. W. Payne, C. W. Streed and E. R. Kent, *Industrial and Engineering Chemistry*, Volume 50, pages 47–52 (1958). Such "selectivity factor" distinguishes ZSM–4 from other crystalline aluminosilicates inasmuch as members of the ZSM–4 family are uniquely characterized by selectivity factors in excess of 4 and generally at least 6.

In accordance with the process of the present invention, an aliphatic charge such as a paraffin hydrocarbon charge can be disproportionated at a temperature between 350° and 900°F., preferably between 400° and 650°F. under a pressure between about 0 and 3,000 psig. If the process is performed continuously, a liquid hourly space velocity between 0.01 and 5 is suitable. In the case of a batch-wise operation, an equivalent contact time is employed.

In accordance with the present invention, a wide variety of feed stocks can be disproportionated, especially when employing a catalytically active form of the ZSM-4 catalyst. Thus, low boiling normal paraffin hydrocarbons which contain 4 or more carbon atoms, such as normal butane, normal pentane, normal hexane, normal heptane, normal octane and the higher straight chain paraffinic homologs can be disproportionated in accordance with this invention.

According to one embodiment of the present invention, an aliphatic charge is contacted in a reaction zone maintained under conditions effective for disproportionation with the ZSM-4 catalyst described above. The disproportionation products are recovered by a suitable separation method, for example, distillation. Thus, a n-pentane feed can be disproportionated and the products separated by distillation into three streams, one containing products lighter than n-pentane, e.g., propane and butanes, one containing pentanes and a third containing hexane and higher molecular weight materials. This scheme can be altered to separate the reactor effluent into a propane, butane stream, a hexane stream and a recycle stream. Similar separation schemes can be provided for other hydrocarbon charges.

EXAMPLE 1

A crystallization directing agent solution was formed by dissolving 4.59 pounds of 97.4 percent sodium hydroxide in 18.2 pounds water and adding thereto 259.2 grams of sodium aluminate and 8.18 pounds sodium s.. icate. Into a propeller mixer was introduced a sodium silicate aqueous solution containing 32.1 pounds sodium silicate and 15.8 pounds water. The propeller mixer was turned on at a low speed and to the sodium silicate solution was added the crystallization directing agent solution. After that solution was added, an alum solution containing 5.65 pounds $Al_2(SO_4)_3 \cdot 14H_2O$, 6.56 pounds 96.5 percent $H_2SO_4$ and 28.5 pounds $H_2O$ was added. This caused the mixture to thicken. Mixing continued with the aid of a spatula. When the mixture was mixed thoroughly, 8.42 pounds of a 24 percent by weight tetramethylammonium hydroxide in methanol solution was added until a smooth paste was formed. The product was poured into three five gallon drums and heated with the drums open to remove the methanol. Thereafter, the drums were sealed and placed in a 100°C. steam box and heated therein until crystallization occurred. A product crystallized after 36 days. The mother liquor was decanted and the remaining precipitate was slurried with 30 gallons of water. The supernatant liquid containing colloidal silica was poured off and the precipitate was re-slurried with 40 gallons water, the supernatant liquid was decanted and the precipitate was again re-slurried with another 40 gallons water. The precipitate was thereafter filtered and dried. The composition analyzed as follows, in terms of mole ratios of oxides:

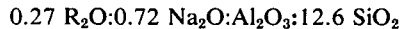

$$0.27\ R_2O:0.72\ Na_2O:Al_2O_3:12.6\ SiO_2$$

It sorbed about 5.8 weight percent cyclohexane and 10.0 weight percent water.

It was thereafter converted to the ammonium form by four (4) successive treatments with a 10 percent by weight aqueous ammonium sulfate solution. After exchange, the product analyzed about 0.2 weight percent sodium.

EXAMPLE 2

Using an ammonium exchanged sodium ZSM-4 alumino-silicate prepared in the method of Example 1 which was thereafter calcined, cooled, stored and calcined at 970°F. additionally for 2 more hours before use, thereby converting it to hydrogen form, an n-pentane charge was disproportionated.

Into the autoclave were charged 50 cc. of the normal pentane and 2 grams of the HZSM-4 catalyst giving a hydrocarbon density of about 0.1 grams per cubic centimeter. The product disproportionated at a temperature of 460°F. and under autogenous pressure yielding both normal and isobutanes together with normal and isohexanes. The selectivity for the disproportionation at 69.3 percent conversion of the normal pentane was the highest. At 69.3 percent the hydrocarbon constituents contained 19.0 percent disproportionation products, 53.0 percent isomerization products and 28.0 percent secondary reaction of products.

EXAMPLE 3

Employing the same catalyst used for the disproportionation reported in Example 2 and freshly calcined for 2 hours at 950°F., isopentane was disproportionated at about 460°F. and under autogenous pressure. The hydrocarbon density in the reaction zone was about 0.5 grams per cubic centimeter. The maximum selectivity for the disproportionation occurred at the 48.8 weight percent conversion level yielding 30.1 weight percent disproportionation products, 35.4 weight percent isomerization products and 27.5 weight percent secondary products.

EXAMPLE 4

When 10 grams of rare earth exchanged Linde Zeolite X (after having been calcined for 23 hours at 850°F., a time and temperature sufficient to produce an activated catalyst) was charged into the autoclave, as described above, containing 235 cc n-pentane, no measurable amount of disproportionation occurred at a temperature of about 460°F. (autogenous pressure) over a period of 23 hours and 20 minutes.

EXAMPLE 5

When 10 grams of a chelated rare earth exchanged Linde Zeolite Y (after having been calcined for 2 hours at 960°F.) was charged into the autoclave together with 235 cc n-pentane and a small amount of 0.2 weight percent pentane-2 to initiate or catalyze disproportionation of the n-pentane, negligible reaction occurred at a temperature between 455 and 465 over a period of greater than 24 hours and under autogenous pressure.

EXAMPLE 6

Similarly, when 10 grams of dealuminized hydrogen mordenite (after sufficient activation by calcination for 2 hours at 960°F.) was employed for an attempted n-pentane disproportionation (235 cc n-pentane) in the presence of 0.2 weight percent pentane-2, only a negligible reaction was observed under autogenous pressure at 456°–466°F. Thus, it is readily observed from the above data that employing a hydrogen form of the ZSM–4 as a catalyst provides good conversions and good selectivities for low temperature paraffin disproportionation. The results of Examples 2, 3, 4, 5 and 6 are tabulated as follows in Table 4.

form of the ZSM–4 catalyst was prepared in the same manner as the catalyst used in Example 2.

Ninety-six grams of isobutane were charged into the above-described apparatus containing 6.5 grams of the hydrogen form of the ZSM–4 catalyst. The reactor was heated continuously up through 475° to 555°F. After 24 hours and 10 minutes of heating up to a temperature of 561°F., the composition was analyzed and found to contain 36.0 weight percent propane, 23.4 weight percent isobutane, 22.3 weight percent normal butane, 8.9 weight percent iso-pentanes, 4.5 weight percent normal pentane, 2.8 weight percent iso-hexanes and 0.7 weight percent normal hexane, indicating that a substantial amount of the isobutane charge disproportionated to form useful hydrocarbon products and that some of the products recombined with one another to form higher molecular weight substances, notably normal and iso-hexanes.

EXAMPLE 8

Into the above-described apparatus was charged 96 grams of normal butane and 6.5 grams of the same catalyst employed in Example 7 above. The reactor was sealed and heated to a temperature of about 550°F. at which temperature the reaction mixture was analyzed after it had been heated for 71 hours and 40 minutes. It analyzed 38.3 weight percent propane, 19.0 weight percent isobutane, 27.5 weight percent normal butane, 7.0 weight percent iso-pentanes, 3.7 weight percent normal pentane, 2.1 weight percent iso-hexanes and 0.5 weight percent normal hexane, indicating that a substantial portion of the charge was disproportionated to form propane and $C_5$ isomers.

From the foregoing, it is apparent that the process of the present invention provides significant amounts of disproportionation products and can be used advantageously in petroleum refineries and other plants to prepare products having higher octane values and useful in gasoline blending. It should also be apparent that the process can be performed at relatively moderate temperatures inexpensively and without use of any special Table 4

Disproportionation of Pentane Charge[1] Over Various Activated Zeolite Catalysts

| Example | | Temperature, °F[2] | Reaction Time, hours | Yield of Disproportionation Products, wt.% of n-Pentane Feed |
|---|---|---|---|---|
| 2 | (ZSM-4, freshly calcined for 2 hours at 970°F) | 460 | 24 2/3<br>47 3/4 | 18.4<br>27.1 |
| 3 | (ZSM-4, freshly calcined for 2 hours at 950°F) | 460 | 24 1/2 | 48.1 |
| 4 | (REHX, freshly calcined for 23 hours at 850°F) | 460 | 48 | 10.0 |
| 5 | (Chelated REY, freshly calcined for 2 hours at 960°F) | 455–465 | 26 5/12 | 0.7 |
| 6 | (Dealuminized Hydrogen Mordenite, freshly calcined for 2 hours at 960°F) | 456–466 | 24 | 0.8 |

[1] Charge for Examples 2,4,5 and 6 was n-pentane; for Example 3, isopentane.
[2] Reaction starting temperature for autogenous pressure reactor autoclave.

EXAMPLE 7

Employing a hydrogen form of a ZSM–4 catalyst, an isobutane charge was disproportionated. The hydrogen equipment or the like.

The hydrogen form of ZSM–4 remained active during n-pentane disproportionation after being on stream for more than 50 hours in the absence of any hydrogenation component or hydrogen. Additionally, unlike n-hexane isomerization which usually yields products low in 2,2-dimethylbutane, the hexanes from disproportionation of pentanes give nearly equilibrium products among all possible isomers, as shown by the following:

|  | Actual | Equilibrium (460°F.) |
|---|---|---|
| n-hexane | 15 | 15 |
| 2,2-dimethylbutane | 20 | 24 |
| 2,3-dimethylbutane | 10 | 9 |
| 2-methylpentane | 34 | 33 |
| 3-methylpentane | 21 | 19 |

According to the process of the instant invention, paraffins can be disproportionated using a catalytically active form of ZSM–4, such as the hydrogen form, at a rate at least double, and sometimes 20 times higher than any known heterogeneous solid catalysts at temperatures between 460° and 500°F.

The terms and expressions used herein have been used as terms of description and not of limitation, as there is no intention, in the use of such terms and expressions, of excluding any equivalents, or portions thereof, as various modifications and departures from the above are contemplated within the scope of the appended claims.

What is claimed is:

1. A method for effecting catalytic conversion of a paraffin charge under conditions of disproportionation which comprises contacting said paraffin charge at a temperature between 350 and 900°F. and under a pressure between 0 and 3,000 psig. with a catalyst comprising a catalytically-active zeolite which can be represented in terms of mole ratios of oxides in the anhydrous state as follows:

$$0.9 \pm 0.2 \, M_{2/n}O : Al_2 O_3 : 3-20 \, SiO_2$$

wherein M is a cation selected from the group consisting of hydrogen, ammonium, alkylammonium and arylammonium and $n$ is the valence of M, said zeolite having the X-ray diffraction pattern values of Table 1 of the specification.

2. A method according to claim 1 wherein said paraffin is a butane.

3. A method according to claim 1 wherein said paraffin is a pentane.

4. A method according to claim 1 wherein said paraffin is a hexane.

5. A method according to claim 1 wherein the catalyst is a product of thermal treatment of said zeolite, said treatment consisting of subjecting said zeolite to a temperature between 700° and 1600°F. for between 1 minute and about 20 hours.

6. A method according to claim 1 wherein M is predominantly hydrogen.

7. A method according to claim 6 wherein said paraffin is a butane.

8. A method according to claim 6 wherein said paraffin is a pentane.

9. A method according to claim 6 wherein said paraffin is a hexane.

* * * * *